United States Patent
Nakazawa et al.

(10) Patent No.: US 6,492,633 B2
(45) Date of Patent: Dec. 10, 2002

(54) OPTICAL SCANNING-TYPE TOUCH PANEL

(75) Inventors: Fumihiko Nakazawa, Kawasaki (JP);
Satoshi Sano, Kawasaki (JP); Atsuo Iida, Kawasaki (JP); Nobuyasu Yamaguchi, Kawasaki (JP); Yasuhide Iwamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/761,752

(22) Filed: Jan. 18, 2001

(65) Prior Publication Data

US 2001/0002694 A1 Jun. 7, 2001

Related U.S. Application Data

(63) Continuation of application No. PCT/JP99/02930, filed on Jun. 1, 1999.

(30) Foreign Application Priority Data

Aug. 18, 1998 (JP) .............................. 10-232068

(51) Int. Cl.$^7$ ................................. G06M 7/00
(52) U.S. Cl. ....................... 250/221; 341/5; 345/175; 178/18.09
(58) Field of Search ................. 250/221, 549; 341/5; 345/173, 175; 178/18.09; 356/621

(56) References Cited

U.S. PATENT DOCUMENTS

| | | | |
|---|---|---|---|
| 4,267,443 A | | 5/1981 | Carroll et al. |
| 4,558,313 A | * | 12/1985 | Garwin et al. ............ 178/18.09 |
| 4,642,422 A | * | 2/1987 | Garwin et al. ............ 178/18.02 |
| 4,762,990 A | * | 8/1988 | Caswell et al. ............. 250/221 |
| 5,525,764 A | * | 6/1996 | Junkins et al. ............ 178/18.01 |

FOREIGN PATENT DOCUMENTS

| | | |
|---|---|---|
| JP | 57-211637 | 12/1982 |
| JP | 62-5428 | 1/1987 |
| JP | 62-99823 | 5/1987 |
| JP | 64-18823 | 1/1989 |
| JP | 9-254220 | 9/1997 |
| JP | 11-110116 | 4/1999 |

* cited by examiner

*Primary Examiner*—Que T. Le
*Assistant Examiner*—Thanh Luu
(74) *Attorney, Agent, or Firm*—Armstrong, Westerman & Hattori, LLP (57) ABSTRACT

In order to measure a scanning light cut-off region, an output of a light receiving element and a threshold value set by an MPU are compared by a comparator and a region where the former is smaller than the latter is measured as the scanning light cut-off region. During one cycle of optical scanning, this threshold value is switched in a plurality of stages according to the scanning angle. By accurately measuring the scanning light cut-off region, the correct position and size of an indicator such as a finger or pen are calculated.

6 Claims, 12 Drawing Sheets

OPTICAL SCANNING-TYPE TOUCH PANEL

This application is a continuation of international application PCT/JP99/02930 filed Jun. 1, 1999.

TECHNICAL FIELD

The present invention relates to an optical scanning-type touch panel for optically detecting the position and size of an indicator on a display screen of a display device on which information is displayed by a computer system, etc.

BACKGROUND ART

With the spread of computer systems, mainly personal computers, a device for inputting new information or giving various instructions to a computer system by pointing at a position on a display screen of a display device on which information is displayed by the computer system, with a person's finger or a specific object, has been used.

In order to perform an input operation with respect to the information displayed on the display screen of the display device of such a personal computer or the like by a touching method, it is necessary to detect a touched position (indicated position) on the display screen accurately. As a method of detecting the indicated position on such a display screen serving as a coordinate surface, the "Carol method" (U.S. Pat. No. 4,267,443) has been known. According to this method, light emitting elements and light receiving elements are arranged to face each other on the frame of the front surface of the display screen so as to construct an optical matrix on the front surface of the display screen, and a position where light is cut off by the touch of a finger or pen is detected. According to this method, a high S/N ratio is obtained, so the application of this method can be extended to a large-sized display device, but since the resolution of detection is in proportion to the arrangement intervals of the light emitting elements and light receiving elements, it is necessary to reduce the arrangement intervals in order to increase the resolution of detection. Therefore, in order to accurately detect a touched position even when a large-sized screen is touched by a thin object such as a point of a pen, such problems arise that the number of light emitting elements and light receiving elements to be arranged is increased and thus the structure becomes bulky, and signal processing becomes complicated.

In addition, another optical position detecting method is disclosed in Japanese Patent Application Laid-Open No. 57-211637/1982. According to this method, a focused light such as a laser beam is scanned angularly from the outside of a display screen, an angle of a position where a special pen exists is calculated from two timings of reflected light from the special pen having a reflecting member, and the resultant angle is applied to the triangulation principle so as to detect the coordinate of the position by calculation. This method can reduce the number of parts significantly, and can provide high resolution. However, there are problems in the operability, for example, a special reflecting pen must be used, and the position of a finger, an arbitrary pen or the like cannot be detected.

Still another optical position detecting method is suggested in Japanese Patent Application Laid-Open No. 62-5428/1987. According to this method, a light retro-reflector is arranged on frames on both sides of a display screen, return light from the light retro-reflector of an angularly scanned laser beam is detected, an angle of a position where a finger or pen exists is calculated from the timing that the light beam is cut off by a finger or pen, and the coordinate of the position is detected from the resultant angle according to the triangulation principle. In this method, detecting accuracy can be maintained with a small number of parts, and the position of a finger, arbitrary pen or the like can be detected.

Moreover, an optical detecting method capable of detecting not only the position but also the size of a finger, arbitrary pen or the like is proposed in Japanese Patent Application No. 9-254220/1997 by the same applicant of the present invention. In this method, at least two light transmitting and receiving sections for angularly scanning laser beam in a plane substantially parallel to a display screen are disposed in the corners of the display screen, a light retro-reflector is arranged along at least three sides of the display screen, a scanning light cut-off region by an indicator such as a finger and pen in a scanned plane is measured, and the position of the indicator in the scanned plane is calculated according to the principle of triangulation and also the size of the indicator is calculated.

According to the above-described three conventional examples in which light is angularly scanned, the light emitting element and the light receiving element for receiving reflected light are juxtaposed so as to construct the light transmitting and receiving section in a small size, and there is a possibility that a part of the foot of laser beam emitted from the light emitting element to perform optical scanning is directly incident on the light receiving element at a position where the scanning angle is small. When the laser beam from the light emitting element is directly incident on the light receiving element, the output level of the light receiving element varies, the directly incident light is mistakenly recognized as reflected light, the scanning light cut-off region is not calculated accurately, and consequently such a problem arises that the correct position or size of the indicator cannot be calculated.

A main object of the present invention is to provide an optical scanning-type touch panel, capable of accurately measuring a scanning light cut-of region and thereby calculating the correct position or size of an indicator, by switching a threshold value with respect to an output of a light receiving element for judging whether a region is a cut-off region, in a plurality of stages according to the scanning angle.

DISCLOSURE OF THE INVENTION

An optical scanning-type touch panel according to the present invention comprises a light retro-reflecting member disposed outside a predetermined area; at least two light transmitting and receiving sections, each having an optical scanner for angularly scanning light in a plane substantially parallel to the predetermined area and a light receiving element for receiving reflected light from a portion of the light retro-reflecting member, which portion was illuminated with light; a measuring section for measuring a scanning light cut-off region formed in the predetermined area by an indicator, according to the scanning angle of the optical scanner and the result of receiving light by the light receiving element; a calculating section for calculating the position and size of the indicator based on the result of the measurement performed by the measuring section; an angle detecting section for detecting an angle of the scanning light; and a memory section for storing a plurality of reference values of different levels, wherein the measuring section measures the scanning light cut-off region by comparing the result of receiving light by the light receiving element with one reference value selected from the plurality of reference values stored in the memory section according to the angle of the scanning light detected by the angle detecting section.

Another optical scanning-type touch panel according to the present invention has the above-described structure, and is designed to select a large reference value when the angle of the scanning light is small and to select a small reference value when the angle of the scanning light is large.

Still another optical scanning-type touch panel according to the present invention has the above-described structure, and is designed such that the angle detecting section includes an optical scanning start detector for detecting the start of optical scanning and a timer having the function of measuring time, and the optical scanning start detector detects the angle of the scanning light according to an elapsed time measured by the timer from a time at which the start of optical scanning was detected by the optical scanning start detector.

Yet another optical scanning-type touch panel according to the present invention has the above-described structure, and is designed such that the optical scanning start detector detects the timing of starting reception of light of not lower than a predetermined level by the light receiving element as the optical scanning start timing.

In the optical scanning-type touch panel of the present invention, when the level of light received by the light receiving element is greater than a predetermined threshold value, it is judged that the scanning light was reflected by the light retro-reflecting member and received by the light receiving element, and the region is judged not to be the scanning light cut-off region formed by the indicator, while when the level of light received by the light receiving element is smaller than the predetermined threshold value, it is judged that the scanning light was cut off by the indicator, the region is measured as the scanning light cut-off region formed by the indicator, and the indicator's position and size are calculated according to the results of the measurement.

Here, in the optical scanning-type touch panel of the present invention, the threshold value used as the reference in judging whether the region is the cut-off region is varied according to the scanning angle. In other words, the threshold value is set to a large value for a small scanning angle at which there is a possibility that a part of the scanning light is directly incident, while the threshold value is set to a small value for a large scanning angle. With this settings, since the threshold value is set in consideration of the direct incident light, the accurate cut-off region can be measured, thereby obtaining accurate values for the position and size of the indicator which are calculated based on this cut-off region.

Further, if the angular velocity of rotation of an optical scanner (for example, polygon mirror) is constant, since the scanning angle is proportional to the rotation time, the scanning angle is detected based on the elapsed time from the start of scanning, and thus the accurate scanning angle is readily detectable.

BEST MODE FOR IMPLEMENTING THE INVENTION

Figure 1:
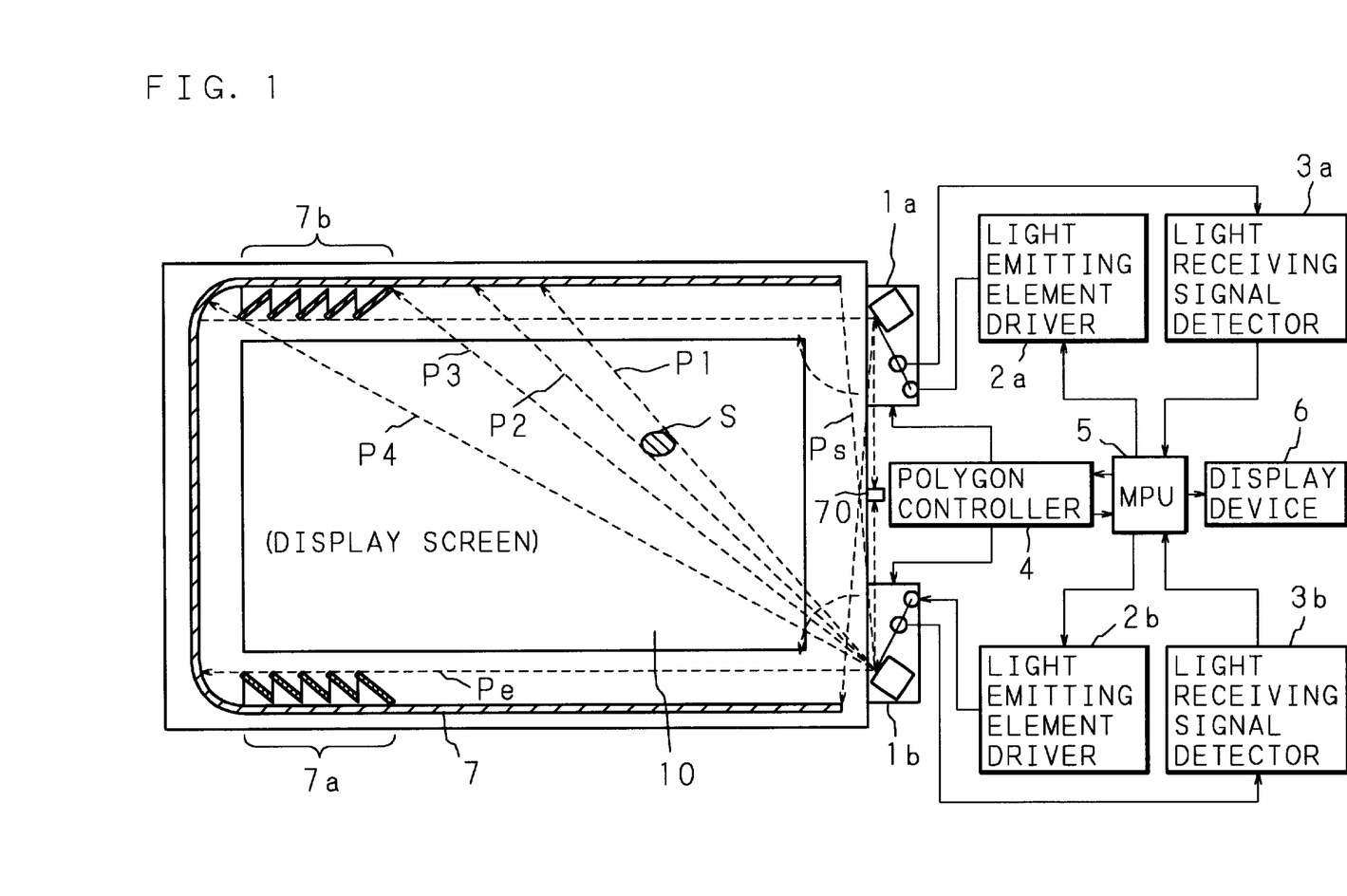
FIG. 1 is a schematic diagram showing the basic structure of an optical scanning-type touch panel of the present invention.

Hereinafter, the present invention will be described in detail with reference to the drawings illustrating an embodiment thereof. FIG. 1 is a schematic diagram showing the basic structure of an optical scanning-type touch panel of the present invention.

In FIG. 1, the reference numeral 10 is a display screen of a CRT, flat display panel (PDP, LCD, EL, etc.) or a projection-type image display device of electronic equipment such as a personal computer, and the present embodiment is constructed as the display screen of a PDP (Plasma Display Panel) having display dimensions of 92.0 cm in a horizontal direction×51.8 cm in a vertical direction and 105.6 cm diagonally.

Light send/receive units 1a and 1b having therein an optical system including a light emitting element, light receiving element, polygon mirror, etc. are provided respectively on the outside of both corners of one short side (the right side in this embodiment) of the rectangular display screen 10 that is the extent of a plane specified as a target area to be touched by an indicator (blocking object)S, for example, a finger or a pen. Moreover, a recurrence reflection sheet 7 is provided on the outside of three sides other than the right side of the display screen 10, namely, the upper and lower sides and the left side. These parts are arranged so as to be shielded by a canopy-shaped interceptor (not shown) disposed on the front side of a housing.

Further, the reference numeral 70 is a light shielding member. This light shielding member 70 is disposed on a line connecting both the light send/receive units 1a and 1b so that direct light does not enter between the light send/receive units 1a and 1b, more specifically light projected from the light send/receive unit 1a does not enter the light send/receive unit 1b, and light projected from the light send/receive unit 1b does not enter the light send/receive unit 1a. Moreover, the light shielding member 70 is an object whose light reflectance is "0" practically, and its height is substantially the same as the height of the recurrence reflection sheet 7.

Figure 2:
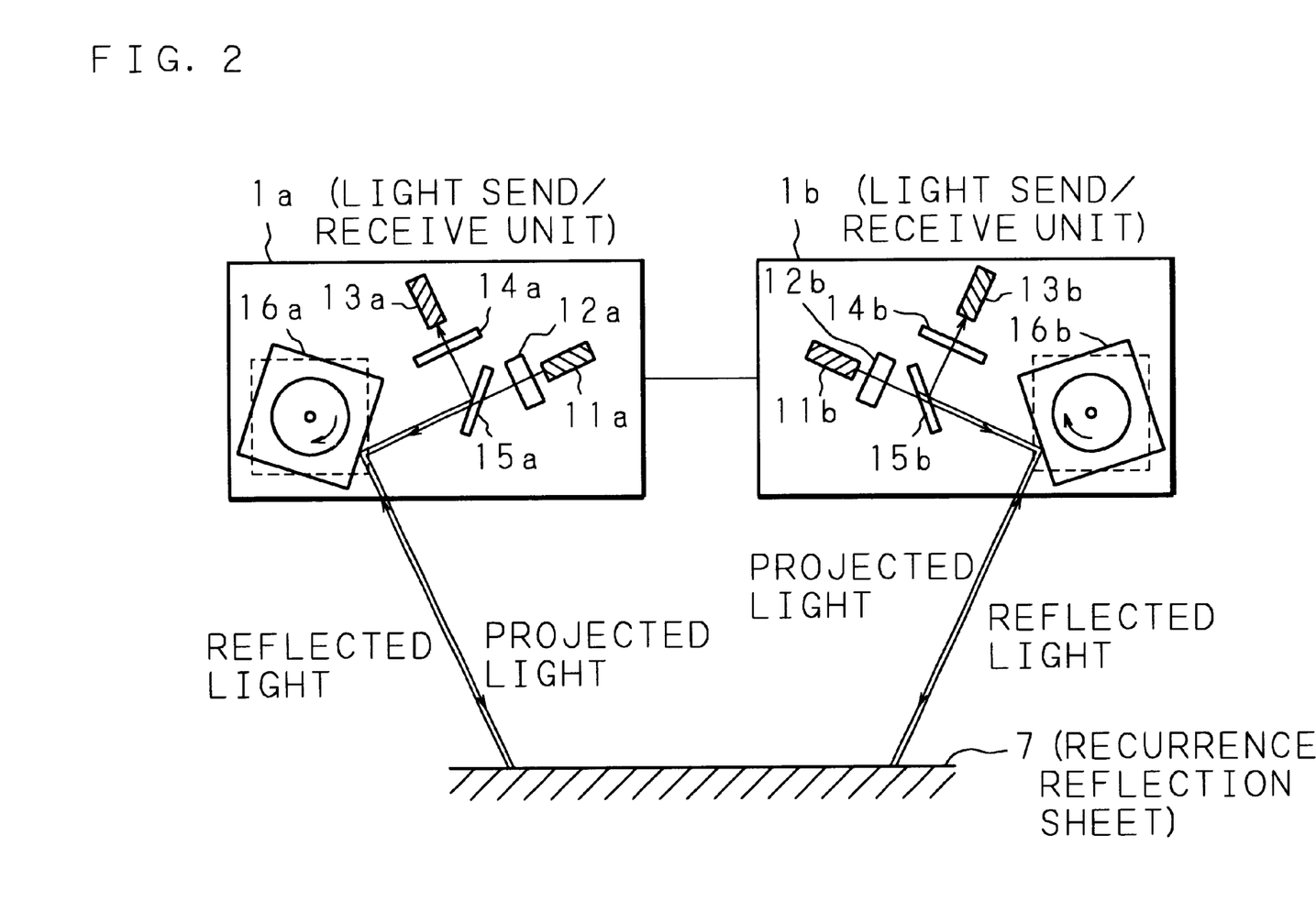
FIG. 2 is a schematic diagram showing the internal structure of light send/receive units and optical paths.

FIG. 2 is a schematic diagram showing the internal structure of the light send/receive units 1a and 1b and the optical paths. Both the light send/receive units 1a and 1b respectively include light emitting elements 11a and 11b composed of laser diodes for emitting infrared laser beams, collimating lenses 12a and 12b for collimating the laser beams from the light emitting elements 11a and 11b, light receiving elements 13a and 13b for receiving reflected light from the recurrence reflection sheet 7, visible light cut filters 14a and 14b for shielding visible light components of external light from the display screen, illumination light, etc. which enters the light receiving elements 13a and 13b, beam splitters 15a and 15b for guiding the reflected light to the light receiving elements 13a and 13b, and polygon mirrors 16a and 16b having the shape of a square column, for example, for angularly scanning the laser beams from the light emitting elements 11a and 11b.

With the rotation of the polygon mirrors 16a and 16b, optical angular scanning at an angle of not less than 90° is realized. The light receiving elements 13a and 13b judge the timing of a synchronous signal by receiving scanned laser beams from the polygon mirrors 16a and 16b at the time each scanning is started, and this timing is used to generate information for correcting of the rotation rate of the polygon mirrors 16a and 16b.

The laser beams emitted from the light emitting elements 11a and 11b are collimated by the collimating lenses 12a and 12b, let through the later-described beam splitters 15a and 15b, and then angularly scanned in a plane which is substantially parallel with the display screen 10 and projected onto the recurrence reflection sheet 7 by the rotation of the polygon mirrors 16a and 16b. After the reflected light beams from the recurrence reflection sheet 7 are reflected by the polygon mirrors 16a and 16b and beam splitters 15a and 15b, the reflected light beams pass through the visible light cut filters 14a and 14b and enter the light receiving elements 13a and 13b, respectively. However, if an indicator S is present in the optical path of the projected light beams, the projected light beams are cut off, and therefore the reflected light beams do not enter the light receiving elements 13a and 13b.

The light send/receive units 1a and 1b are connected with light emitting element drivers 2a and 2b for driving the light emitting elements 11a and 11b, light receiving signal detectors 3a and 3b for converting the amount of light received by the light receiving elements 13a and 13b into an electric signal, and a polygon controller 4 for controlling the operation of the polygon mirrors 16a and 16b, respectively. Moreover, the reference numeral 5 represents an MPU for calculating the position and size of the indicator S and for controlling the operation of the entire apparatus, and 6 represents a display device for displaying the results of the calculation performed by the MPU 5.

In such an optical scanning-type touch panel of the present invention, as shown in FIG. 1, if the explanation is given with respect to the light send/receive unit 1b, for example, the projected light from the light send/receive unit 1b is scanned in a counterclockwise direction in FIG. 1 from a position where the projected light is incident on the light receiving element 13b, via a position where the projected light is shielded by the light shielding member 70, up to a position (Ps) where the projected light is reflected by an end of the recurrence reflection sheet 7, that is, a scanning start position. Thereafter, the projected light is reflected by the recurrence reflection sheet 7 until it comes to a position (P1) where the projected light reaches one end of the indicator S, but the projected light is shielded by the indicator S up to a position (P2) where it reaches the other end of the indicator S, and then the projected light is reflected by the recurrence reflection sheet 7 until it comes to a scanning end position (Pe).

However, in the light send/receive unit 1a, the light is scanned in a clockwise direction in FIG. 1. The light send/receive unit 1a scans the light in a clockwise direction in FIG. 1 with the lower side of the display screen 10 as the scanning start direction, while the light send/receive unit 1b performs scanning in a counterclockwise direction in FIG. 1 with the upper side of the display screen 10 as the scanning start direction. The reason for this will be explained below.

In the case of the light send/receive unit 1b, either the upper side or the left side of the display screen 10 can be set as the scanning start direction. However, the upper side of the display screen 10 is set as the scanning start direction because, when seen from the light send/receive unit 1b, the upper side of the display screen 10 is closer than the lower side and the amount of the reflected light is larger, and because the light is incident on the reflecting surface of the recurrence reflection sheet 7 at substantially right angles on the upper side of the display screen 10 and the amount of the reflected light is larger. In other words, for the light send/receive unit 1b, if the lower side of the display screen 10 is set as the scanning start direction, since the lower side of the display screen 10 is farther than the upper side, the amount of the reflected light at the start of scanning becomes smaller, and also since the reflecting surface of the recurrence reflection sheet 7 is curved, the amount of the reflected light becomes smaller. However, the curve of the recurrence reflection sheet 7 is not an essential problem, and, of course, it is possible to adopt a structure where the recurrence reflection sheet 7 is not curved.

By the way, as shown in FIG. 1, the recurrence reflection sheet 7 is arranged in a U-shaped form to surround the display screen 10 with a side, on which both of the light send/receive units 1a and 1b are disposed, open. Further, as represented by the reference codes 7a and 7b, the recurrence reflection sheet 7 is arranged in a sawtooth form at portions where an angle at which the light is projected from both the light send/receive units 1a and 1b to the recurrence reflection sheet 7 becomes smaller, more specifically, portions of two sides (the upper and lower sides in FIG. 1) orthogonal to the side on which both of the light send/receive units 1a and 1b are positioned, which portions are far from both of the light receive/send units 1a and 1b.

Due to such sawtooth portions 7a and 7b of the recurrence reflection sheet, for example, as the scanning proceeds from the position Ps to position P3 on one end of the sawtooth portion 7b of the recurrence reflection sheet, the angle of incidence of the projected light from the light receiving unit 1b to the recurrence reflection sheet 7 becomes smaller gradually, and consequently the amount of the reflected light becomes smaller. However, since the projected light enters the sawtooth portion 7b of the recurrence reflection sheet 7 at substantially right angles during the scanning from the position P3 of one end of the sawtooth portion 7b of the recurrence reflection sheet 7 to position P4 of the other end, it is possible to avoid a further lowering of the recursive reflection factor.

Figure 3:
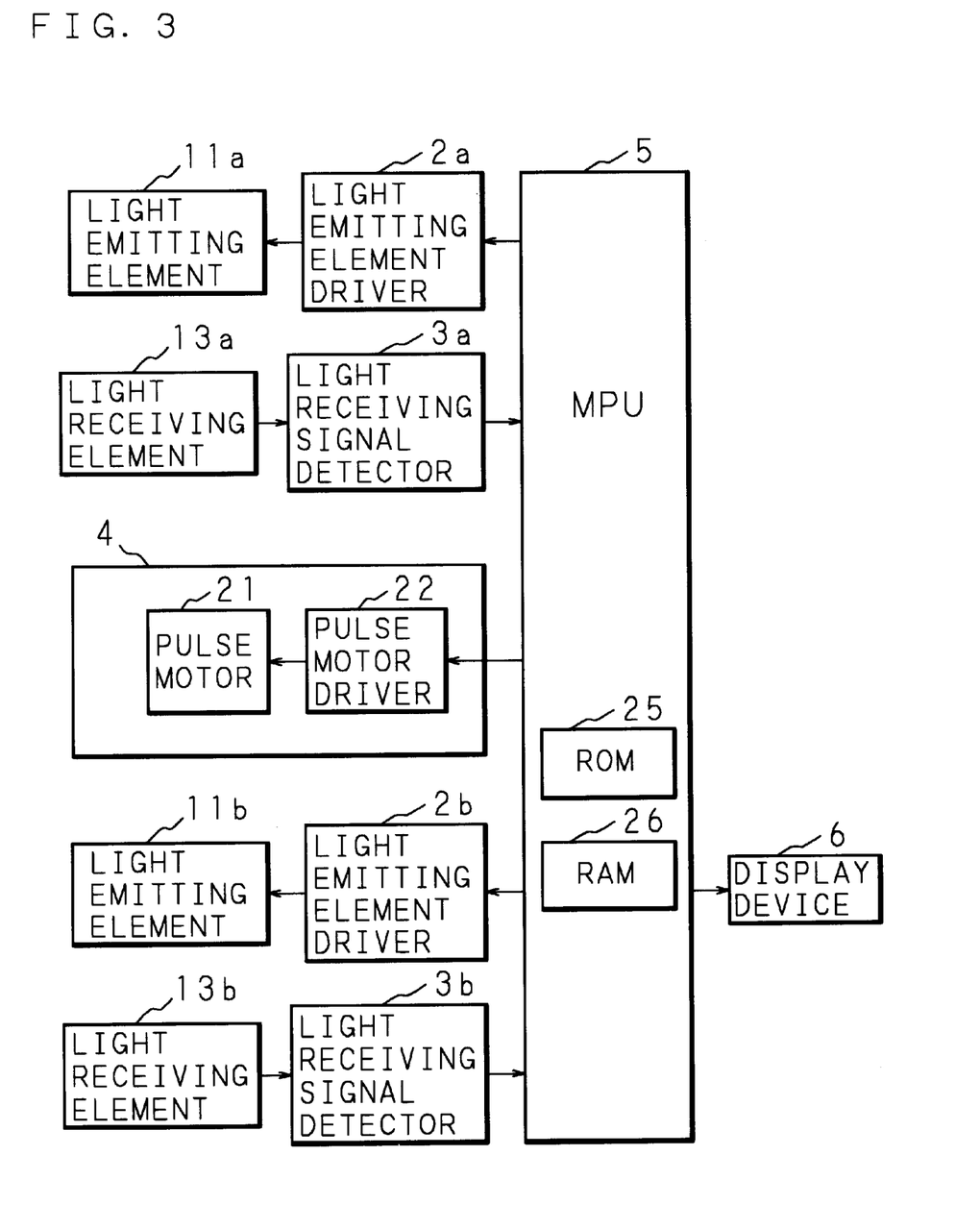
FIG. 3 is a block diagram of the optical scanning-type touch panel of the present invention.

FIG. 3 is a block diagram showing the relationship between the MPU 5 and another circuit. The polygon controller 4 has a pulse motor 21 for rotating the polygon mirrors 16a and 16b, and a pulse motor driver 22 for driving the pulse motor 21.

The MPU 5 transmits driving control signals to the light emitting element drivers 2a and 2b, and then the light emitting element drivers 2a and 2b are driven according to the driving control signals, so that the light emitting operation of the light emitting elements 11a and 11b is controlled.

The light receiving signal detectors 3a and 3b transmit light receiving signals of the reflected light of the light receiving elements 13a and 13b to the MPU 5. The MPU 5 calculates the position and size of the indicator S based on the light receiving signals from the light receiving elements 13a and 13b, and displays the results of the calculation on the display device 6. Here, the display device 6 may also serve as the display screen 10. Moreover, the MPU 5 transmits a driving control signal for driving the pulse motor 21 to the pulse motor driver 22.

In addition, the MPU 5 includes therein a read only memory (ROM) 25 for storing algorithms of the procedure of calculating a plurality of threshold values according to scanning angles for measuring a scanning light cut-off region, and the position and size of the indicator S; and a random access memory (RAM) 26 for storing the intermediate values in the calculation procedure and the calculated values for the position and size of the indicator S.

Figure 4:
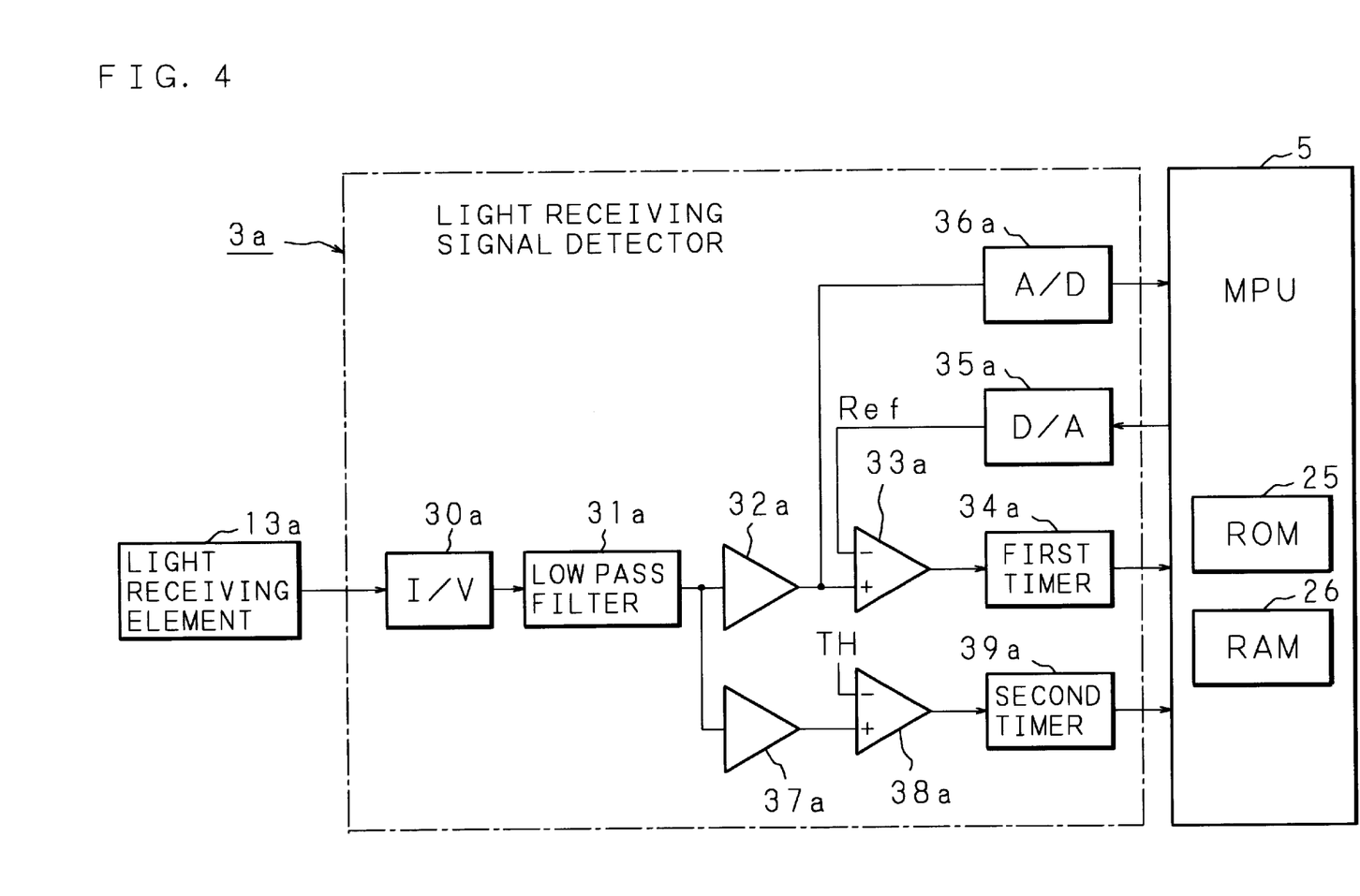
FIG. 4 is a block diagram showing an example of the structure of a light receiving signal detector.

FIG. 4 is a block diagram showing an example of the structure of the light receiving signal detector 3a. Note that the light receiving signal detector 3b has the same structure as the light receiving signal detector 3a, and the light receiving signal detector 3b will be explained, if necessary, by replacing the character "a" at the end of the reference code with "b".

Since the light receiving element 13a outputs the amount of the received light as a light receiving signal proportional to the current value, an output signal (current) from the light receiving element 13a is converted into a voltage signal by a current/voltage (I/V) converter 30a. The voltage signal output from the current/voltage converter 30a passes through a low-pass filter 31a and is input as a signal to be subjected to comparison to one of the input terminals of a comparator 33a from an amplifier 32a. The output of the comparator 33a is input to a first timer 34a, and the output of the first timer 34a is input to the MPU 5. The output of the amplifier 32a is also supplied to an A/D converter 36a where it is converted into a digital signal, and then input to the MPU 5. Besides, the digital signal output from the MPU 5 is converted into an analog signal by a D/A converter 35a and input as a comparative threshold value Ref to the other input terminal of the comparator 33a. The size of this threshold value Ref is not constant, and is varied according to the scanning angle.

Moreover, the output of the low-pass filter 31a is input as a signal to be subjected to comparison to one of the input terminals of a comparator 38a via an amplifier 37a. The output of this comparator 38a is input to a second timer 39a, and the output of the second timer 39a is input to the MPU 5. Further, a comparative threshold value TH of the comparator 38a is set at a suitable level between the maximum output during the detection of timing and the maximum output during the detection of an indicated position.

The following description will explain the operations of the light receiving signal detector 3a (also 3b) having such a structure and the MPU 5. Since the comparative threshold value TH in the comparator 38a is of a level between the maximum output during the detection of timing and the maximum output during the detection of a indicated position, the comparator 38a outputs a signal "1" only in a period during which the light receiving element 13a is receiving the directly reflected light from the polygon mirror 16a, and outputs a signal "0" in other periods. Therefore, the timing of a rise of the output signal of the comparator 38a to "1" from "0" is the optical scanning start timing.

The second timer 39a starts a measuring operation at the timing of a rise of the output signal of the comparator 38a to "1" from "0" (the optical scanning start timing), and continues to perform the measuring operation until the next timing of a rise of the output signal to "1" from "0" (the optical scanning start timing). In other words, the second timer 39a is reset at each optical scanning start timing, so as to measure the elapsed time from the start of optical scanning in each optical scanning, and outputs the result of the measurement to the MPU 5. Moreover, by measuring the time interval between the rises of the output signal of the comparator 38a to "1" from "0", it is possible to monitor a rotation state of the polygon mirror 16a.

Since the output of the amplifier 32a is converted into a digital signal by the A/D converter 36a and then input to the MPU 5, the MPU 5 can monitor the output signal of the light receiving element 13a for a certain period of time as the digital signal.

The MPU 5 is capable of supplying the comparative threshold value Ref to the other input terminal of the comparator 33a by outputting the digital signal to the D/A converter 35a to convert the digital signal into an analog signal. Here, the threshold value Ref to be added to the comparator 33a is not constant, and is varied according to the scanning angle. The MPU 5 recognizes the elapsed time from the start of optical scanning from the result of the measurement performed by the second timer 39a, reads a threshold value corresponding to the elapsed time from the ROM 25, and inputs to the comparator 33a a threshold value Ref obtained by the digital conversion of the threshold value. Further, since the angular velocity of the rotation of the polygon mirror 16a is constant, the scanning angle is proportional to the rotation time, and therefore the information about the scanning angle is obtainable by measuring the elapsed time from the start of optical scanning.

Then, the comparator 33a compares the output of the amplifier 32a with the threshold value Ref supplied from the MPU 5, and outputs "1" if the output of the amplifier 32a is not smaller than the threshold value, or outputs "0" if the output of the amplifier 32a is smaller than the threshold value. The first timer 34a measures the duration of the "1" output and the "0" output from this comparator 33a, and outputs the result of the measurement to the MPU 5.

Figure 5:
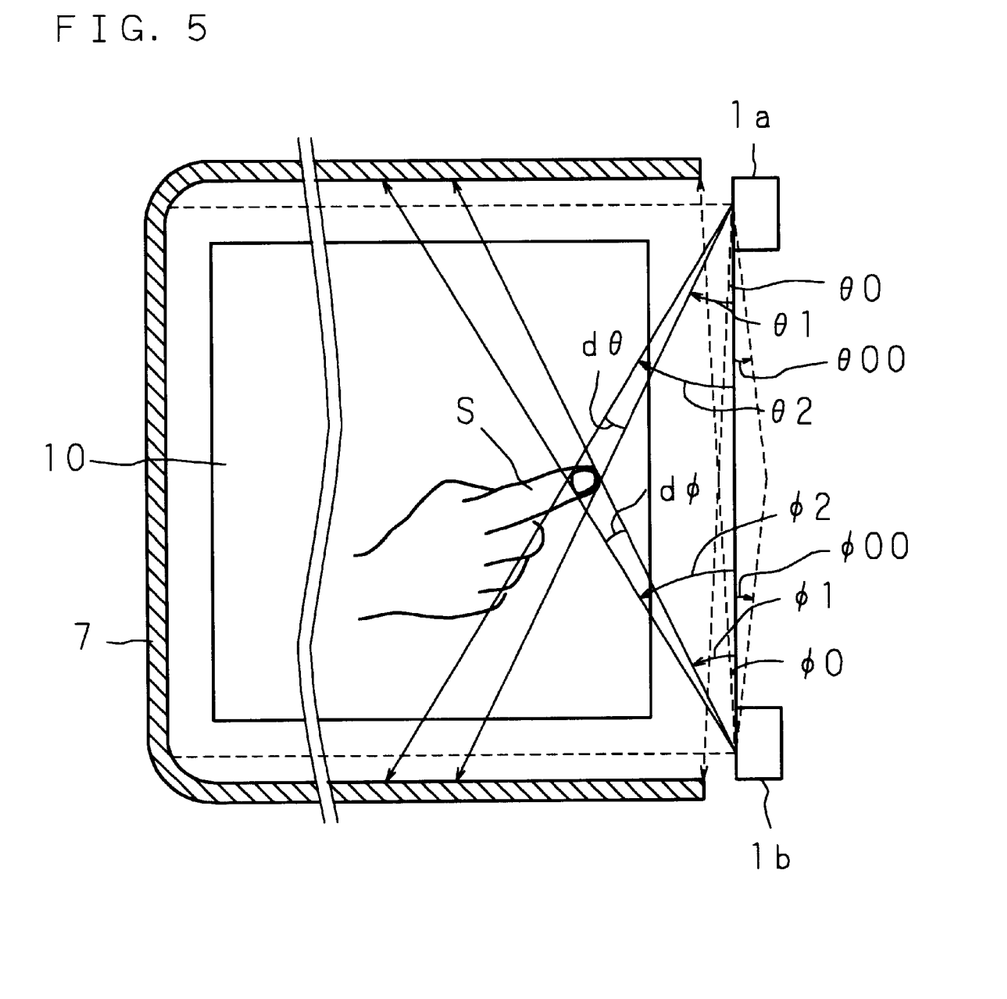
FIG. 5 is a schematic diagram showing a state of implementing the optical scanning type touch panel of the present invention.

Next, the following description will explain the operation of calculating the position and size of the indicator S by the optical scanning-type touch panel of the present invention. FIG. 5 is a schematic diagram showing a state of implementing the optical scanning-type touch panel. In FIG. 5, however, the illustration of the constituent members other than the light send/receive units 1a, 1b, recurrence reflection sheet 7 and display screen 10 is omitted. Further, FIG. 5 shows the case where a finger is used as the indicator S.

The MPU 5 controls the polygon controller 4 to rotate the polygon mirrors 16a and 16b in the light send/receive units 1a and 1b, and thereby angularly scanning the laser beams from the light emitting elements 11a and 11b. As a result, the reflected light from the recurrence reflection sheet 7 enters the light receiving elements 13a and 13b. The amounts of the received light that entered the light receiving elements 13a and 13b as mentioned above are obtained as the light receiving signals which are the outputs of the light receiving signal detectors 3a and 3b.

Further, in FIG. 5, $\theta00$ and $\phi00$ represent the angles from a reference line connecting both of the light send/receive units 1a and 1b to the light receiving elements 13a and 13b, $\theta0$ and $\phi0$ represent the angles from the reference line connecting both of the light send/receive units 1a and 1b to the ends of the recurrence reflection sheet 7, $\theta1$ and $\phi1$ represent the angles from the reference line to one end of the indicator S on the reference line side, and θ2 and φ2 represent the angles from the reference line to another end of the indicator S on the opposite side to the reference side, respectively.

Figure 6:
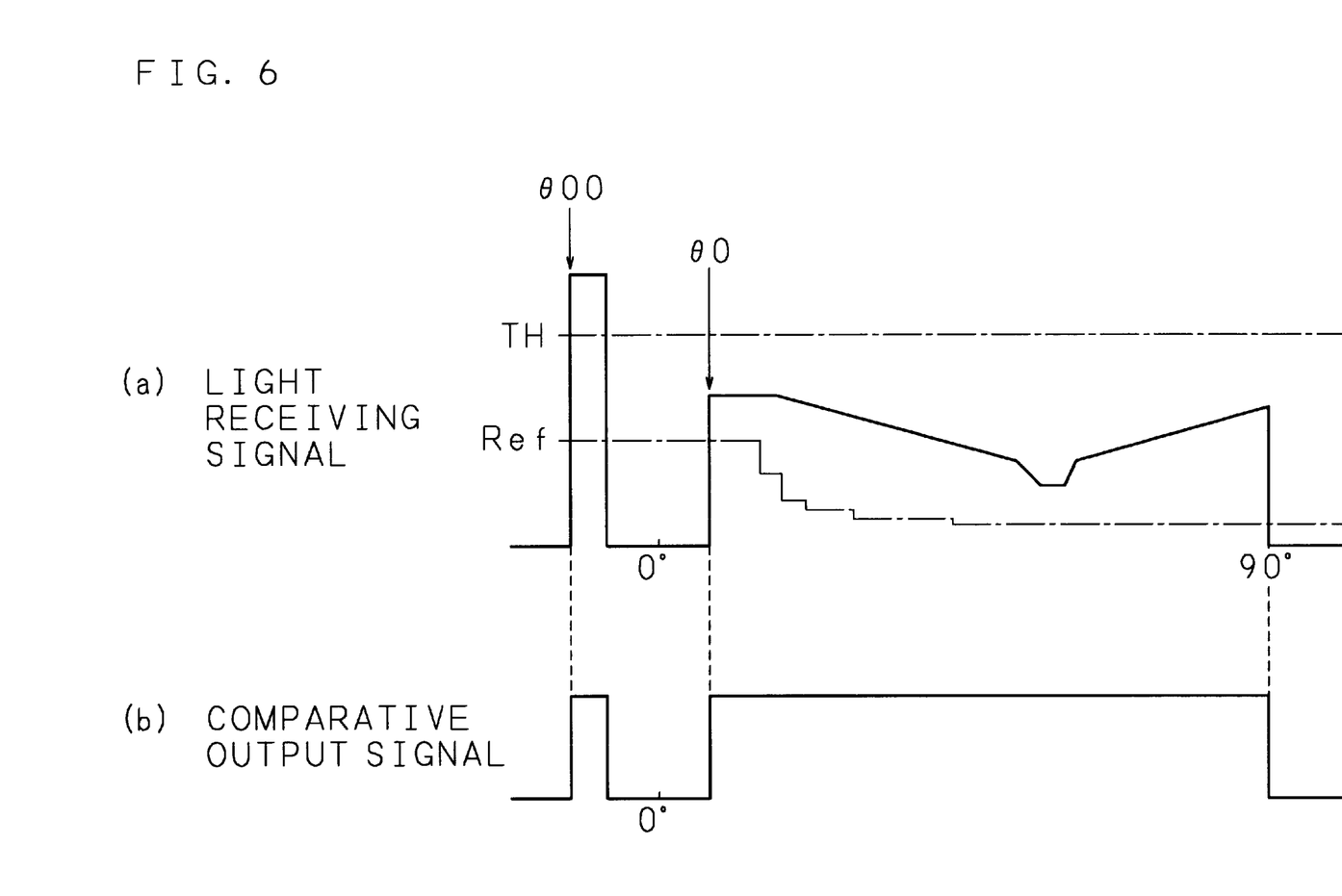
FIG. 6 is a waveform chart showing a waveform of a light receiving signal and a waveform of its comparative output signal when an indicator is not present.

FIG. 6(a) shows a waveform of a light receiving signal of the light receiving element 13a and a waveform of the threshold value Ref in the comparator 33a when the indicator S is not present, while FIG. 6(b) shows a waveform of a comparative output signal given by the comparator 33a at this time. Note that the same waveforms are produced for the light send/receive unit 1b.

When the scanning angle is θ00 (φ00), the light receiving element 13a (13b) directly receives the light from the light emitting element 11a (11b). This state is detected as the timing of changing the output signal of the comparator 38a from "0" to "1", and further the cycle thereof is measured by the second timer 39a. Accordingly, since the MPU 5 can monitor the rotation cycle of the polygon mirror 16a (16b), it corrects the rotation of the pulse motor 21 that rotates the polygon mirror 16a (16b), if necessary, by controlling the polygon controller 4. Moreover, the second timer 39a measures the elapsed time from the start of optical scanning. The MPU 5 determines a threshold value Ref used in the comparator 33a according to this elapsed time.

Further, when the polygon mirror 16a (16b) is a four-face regular polygon as in the present embodiment, the polygon mirror 16a (16b) makes ¼ rotation in one cycle of measurement by the second timer 39a.

When the indicator S is not present in the optical path of the scanning light, in the timing of θ00 (φ00) shown in FIG. 6(a), following the direct incidence on the light receiving element 13a (13b), the reflected light from the recurrence reflection sheet 7 enters the light receiving elements 13a (13b). As shown in FIG. 6(a), the amount of the reflected light from the recurrence reflection sheet 7 becomes maximum at the first angle of θ0 (φ0) because of the reception of the reflected light from the nearest portion of the recurrence reflection sheet 7, and thereafter the amount of the reflected light decreases gradually, becomes minimum once at a corner portion in a diagonal direction, which is a farthest portion of the recurrence reflection sheet 7, and then increases gradually and becomes minimum at an angle of 90° to complete one cycle of scanning.

Moreover, the threshold value Ref becomes maximum at a small scanning angle (just after starting optical scanning) at which there is a high possibility that a part of the laser beam emitted from the light emitting element 11a (11b) directly enters the light receiving element 13a (13b), and decreases as the scanning angle becomes smaller, i.e., as the elapsed time from the start of optical scanning becomes longer.

By the way, when a threshold value Ref is set in the comparator 33a as mentioned above, the MPU 5 inputs the result of the measurement performed by the first timer 34a for measuring the time during which an output signal of the comparator 33a is "1", i.e., the level of an input signal to the comparator 33a is not less than the threshold value Ref. When the device is in normal conditions, an output "1" of a relatively short time caused by the directly incident light on the light receiving element 13a and an output "1" of a relatively long time caused by the reflected light from the recurrence reflection sheet 7 are obtained as the output signals of the comparator 33a. However, since the output "1" of a relatively short time caused by the directly incident light on the light receiving element 13a is synchronous with the measuring cycle of the second timer 39a, as shown in FIG. 6(b), the MPU 5 stores in the RAM 26 only the duration of the output "1" of a relatively long time caused by the reflected light from the recurrence reflection sheet 7 as the measured time.

Figure 7:
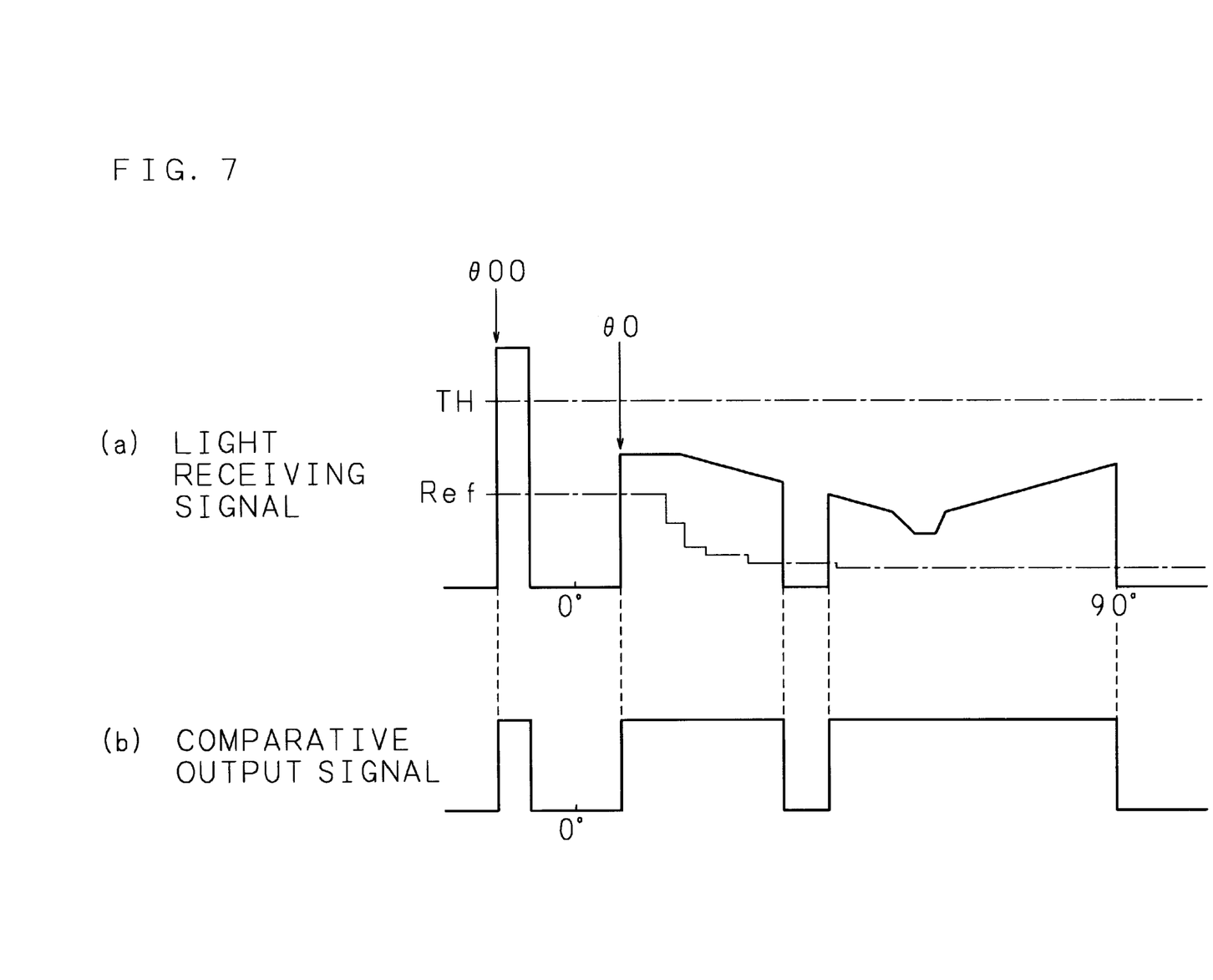
FIG. 7 is a waveform chart showing a waveform of a light receiving signal and a waveform of its comparative output signal when an indicator is present.

FIG. 7(a) shows a waveform of a light receiving signal of the light receiving element 13a and a waveform of the threshold value Ref in the comparator 33a when the indicator S is present, while FIG. 7(b) shows a waveform of a comparative output signal of the comparator 33a at this time. Note that the same waveforms are produced for the light send/receive unit 1b.

When the indicator S is present in the optical path of the scanning light on the display screen 10, the light beams projected from the light send/receive units 1a and 1b and then reflected from the indicator S do not enter the light receiving elements 13a and 13b. Therefore, in a state as shown in FIG. 5, the reflected light does not enter the light receiving element 13a when the scanning angle is in the range between 0° and θ0, the reflected light enters the light receiving element 13a when the scanning angle is in the range between θ0 and θ1, and the reflected light does not enter the light receiving element 13a when the scanning angle is in the range between θ1 and θ2. Similarly, the reflected light does not enter the light receiving element 13b when the scanning angle is in the range between 0° and φ0, the reflected light enters the light receiving element 13b when the scanning angle is in the range between φ0 and φ1, and the reflected light does not enter the light receiving element 13b when the scanning angle is in the range between φ1 and φ2.

Figure 8A:
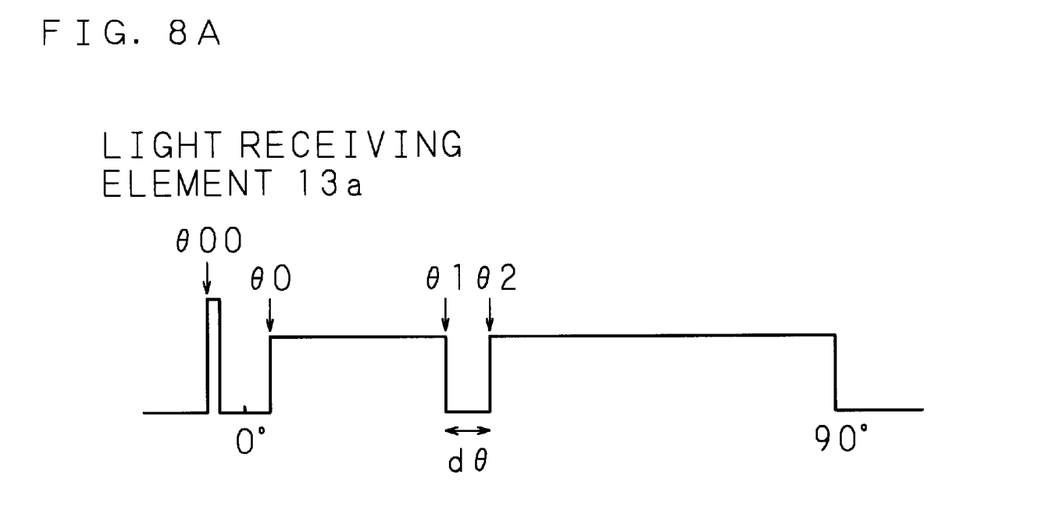
FIGS. 8A and 8B are timing charts showing variations of the level of the light receiving signal.
Figure 8B:
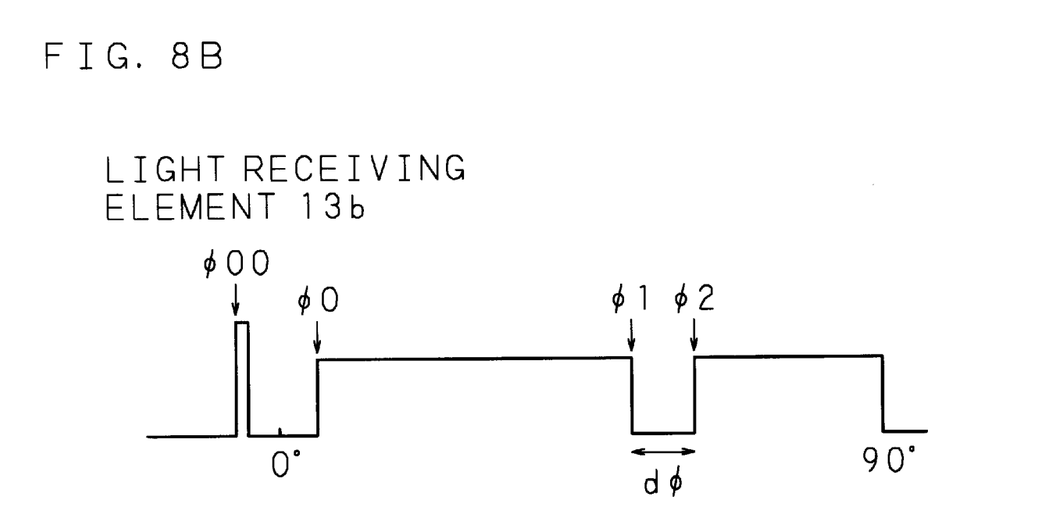

Such angles are calculated from the results of the comparison between the level of the light receiving signal and the threshold value Ref as shown in FIGS. 7(a) and 7(b), i.e., the timing of a rise or fall of the light receiving signal (see FIGS. 8A and B). Accordingly, the cut-off region by a person's finger as the indicator S can be calculated as dθ=θ2−θ1, and dφ=φ2−φ1.

Here, needless to say, θ00 and φ00, and θ0 and φ0 are known from the positional relationship between the reference line connecting the light send/receive units 1a and 1b and the light receiving elements 13a and 13b, and the positional relationship between the reference line and the ends of the recurrence reflection sheet 7.

Hence, in the optical scanning-type touch panel of the present invention, since the optical scanning cut-off region is calculated by varying the size of the threshold value Ref of the comparator 33a according to the optical scanning angle (the elapsed time from the start of optical scanning) and comparing the output of the light receiving element 13a (13b) with this threshold value Ref, it is possible to eliminate the effect of the directly incident light on the light receiving element 13a (13b) and calculate the accurate cut-off region.

Figure 9:
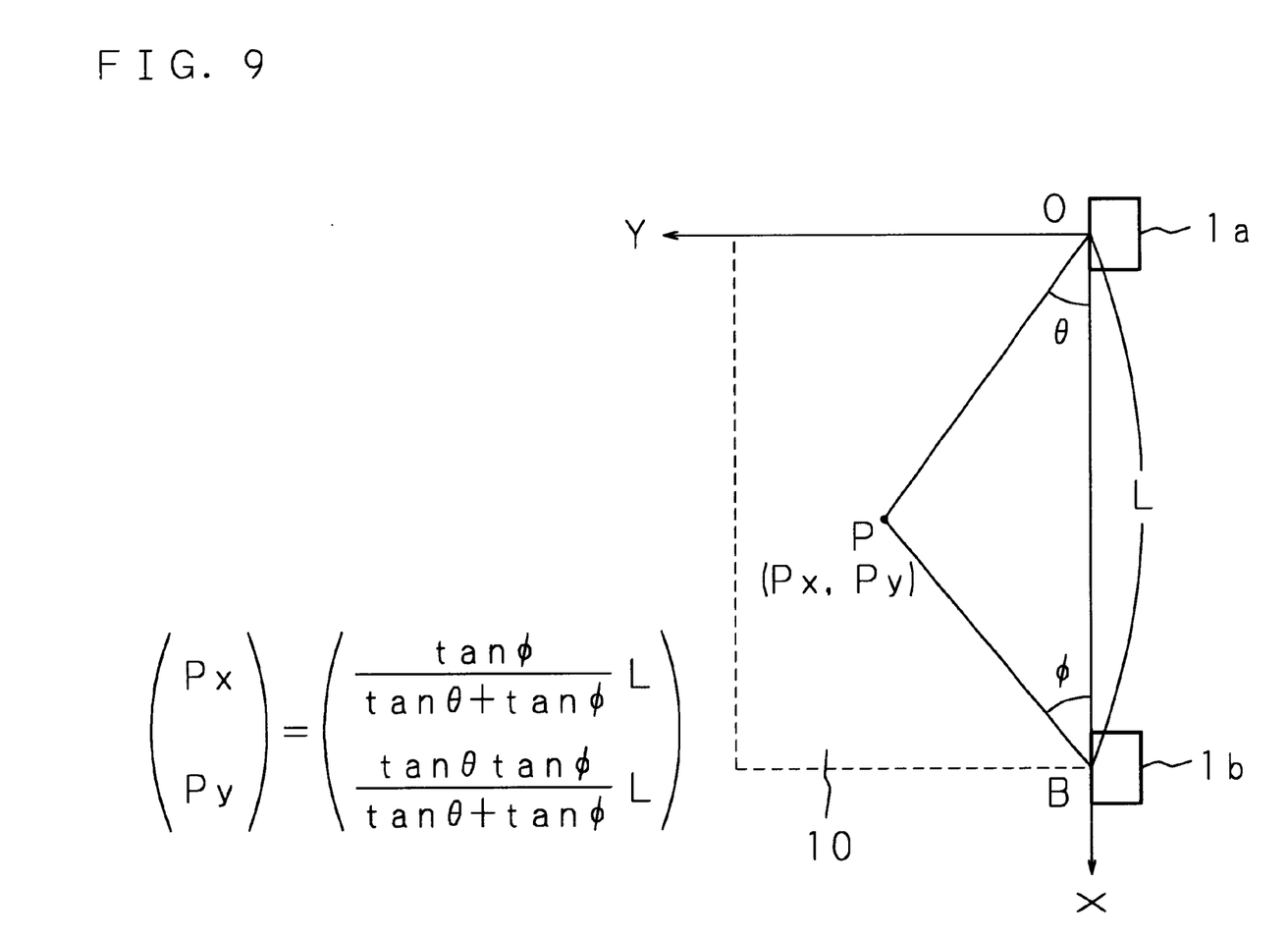
FIG. 9 is a schematic diagram showing the principle of triangulation for detecting a coordinate.

Next, the following description will explain a process of calculating a coordinate of a central position (indicated position) of the indicator S (a finger in this example) from the cut-off region calculated in the above-mentioned manner. First, the conversion of an angle into an orthogonal coordinate based on the triangulation will be explained. As shown in FIG. 9, the position of the light send/receive unit 1a is set as an origin O, the right side and upper side of the display screen 10 are set as the X axis and Y axis, and the length of the reference line (the distance between the light send/receive units 1a and 1b) is set as L. Moreover, the position of the light send/receive unit 1b is set as B. When a central point P (Px, Py) on the display screen 10 indicated by the indicator S is positioned at angles of θ and φ with respect to the X axis from the light send/receive units 1a and 1b, the values of X coordinate Px and Y coordinate Py of the point P can be calculated according to the principle of the triangulation as given by equations (1) and (2) below, respectively.

$$Px=(\tan\phi)+(\tan\theta+\tan\phi)\times L \quad (1)$$

$$Py=(\tan\theta\cdot\tan\phi)+(\tan\theta+\tan\phi)\times L \quad (2)$$

Figure 10:
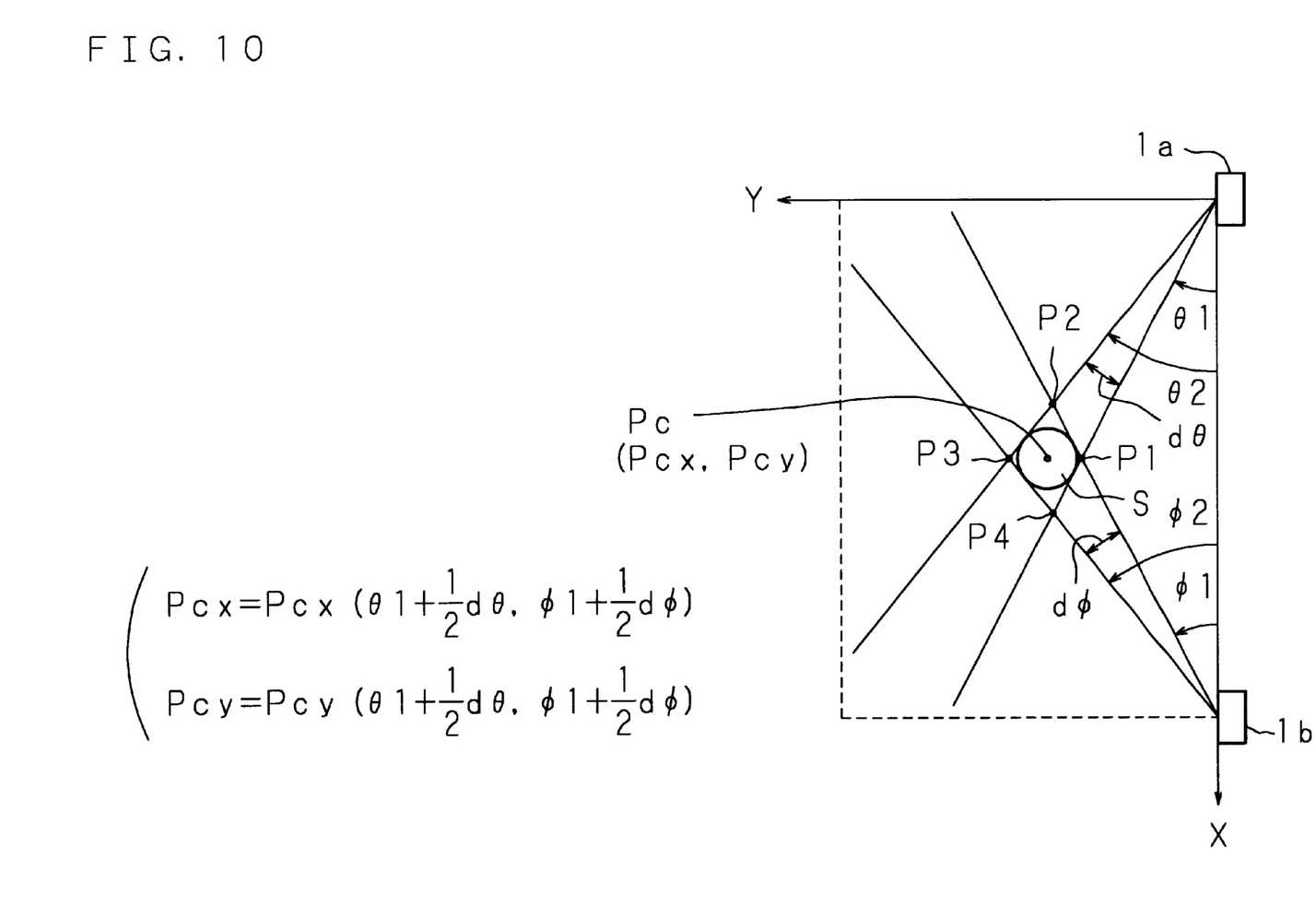
FIG. 10 is a schematic diagram showing the indicator and the cut-off region.

By the way, since the indicator S (finger) has a size, when the detecting angle for the timing of rise/fall of the detected light receiving signal is adopted, as shown in FIG. 10, four points (P1 through P4 in FIG. 10) of the edge portion of the indicator S (finger) are detected. These four points are all different from the indicated central point (Pc in FIG. 10). Thus, a coordinate (Pcx, Pcy) of the central point Pc is calculated as follows. If Px=Px (θ, φ) and Py=Py (θ, φ), Pcx and Pcy can be given by equations (3) and (4) below.

$$Pcx=Pcx(\theta 1+d\theta/2, \phi 1+d\phi/2) \quad (3)$$

$$Pcy=Pcy(\theta 1+d\theta/2, \phi 1+d\phi/2) \quad (4)$$

Then, by substituting θ1+dθ/2 and φ1+dφ/2 given by equations (3) and (4) for θ and φ in equations (1) and (2) above, the coordinate of the indicated central point Pc can be obtained.

In the above-mentioned example, the average value of the angle is calculated first and substituted in the triangulation converting equations (1) and (2) to calculate the coordinate of the central point Pc as the indicated position. However, it is also possible to calculate the coordinate of the central point Pc by first calculating the orthogonal coordinates of the four points P1 through P4 from the scanning angle according to the triangulation converting equations (1) and (2) and calculating the average of the calculated coordinate values of the four points. Moreover, considering parallax and easy viewing of the indicated position, the coordinate of the central point Pc as the indicated position can be determined.

Figure 11:
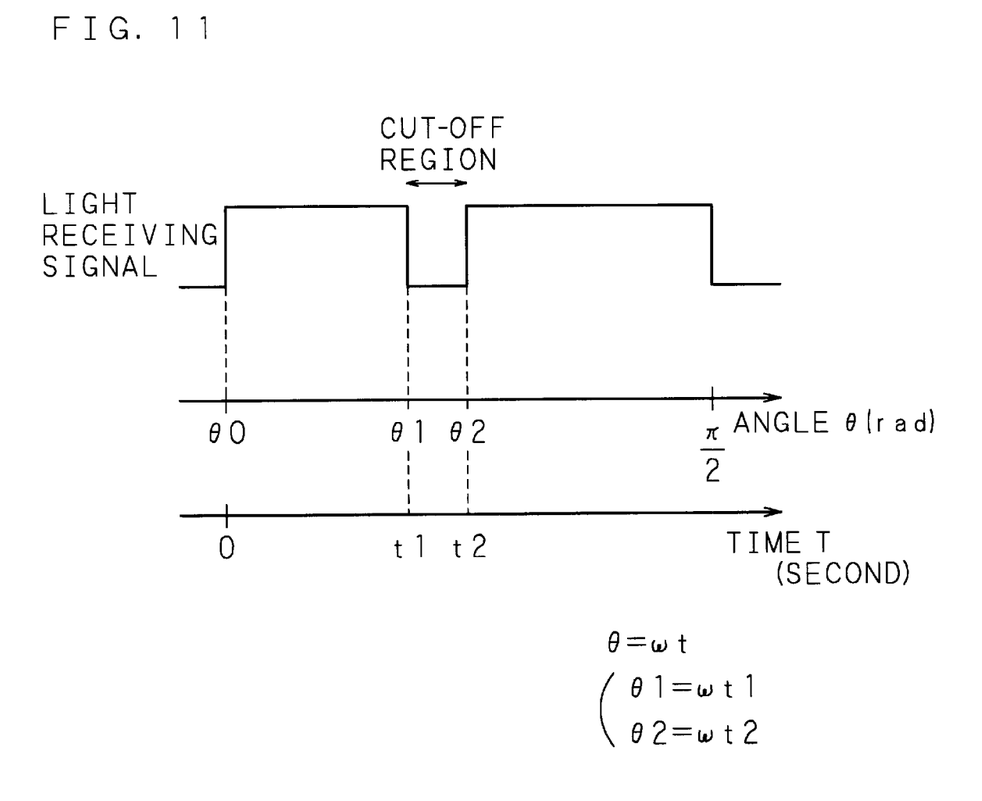
FIG. 11 is a timing chart showing the relationship between the light receiving signal, scanning angle and scanning time.

By the way, as mentioned above, since the angular velocity of the rotation of the polygon mirrors 16a and 16b is constant, the information about the scanning angle is obtainable by measuring the time. FIG. 11 is a timing chart showing the relationship between the light receiving signal from the light receiving signal detector 3a and the scanning angle θ and scanning time T of the polygon mirror 16a. When the angular velocity of the rotation of the polygon mirror 16a is constant, if the angular velocity of the rotation is represented by ω, a proportional relationship as given by equation (5) below is established between the scanning angle θ and the scanning time T.

$$\theta=\omega\times T \quad (5)$$

Therefore, the angles θ1 and θ2 at the time of the fall and rise of the light receiving signal establish the relationships given by equations (6) and (7) below with the scanning time t1 and t2.

$$\theta 1=\omega\times t1 \quad (6)$$

$$\theta 2=\omega\times t2 \quad (7)$$

Thus, when the angular velocity of the rotation of the polygon mirrors 16a and 16b is constant, it is possible to measure the cut-off region and coordinate position of the indicator S (finger) by using the time information.

Figure 12:
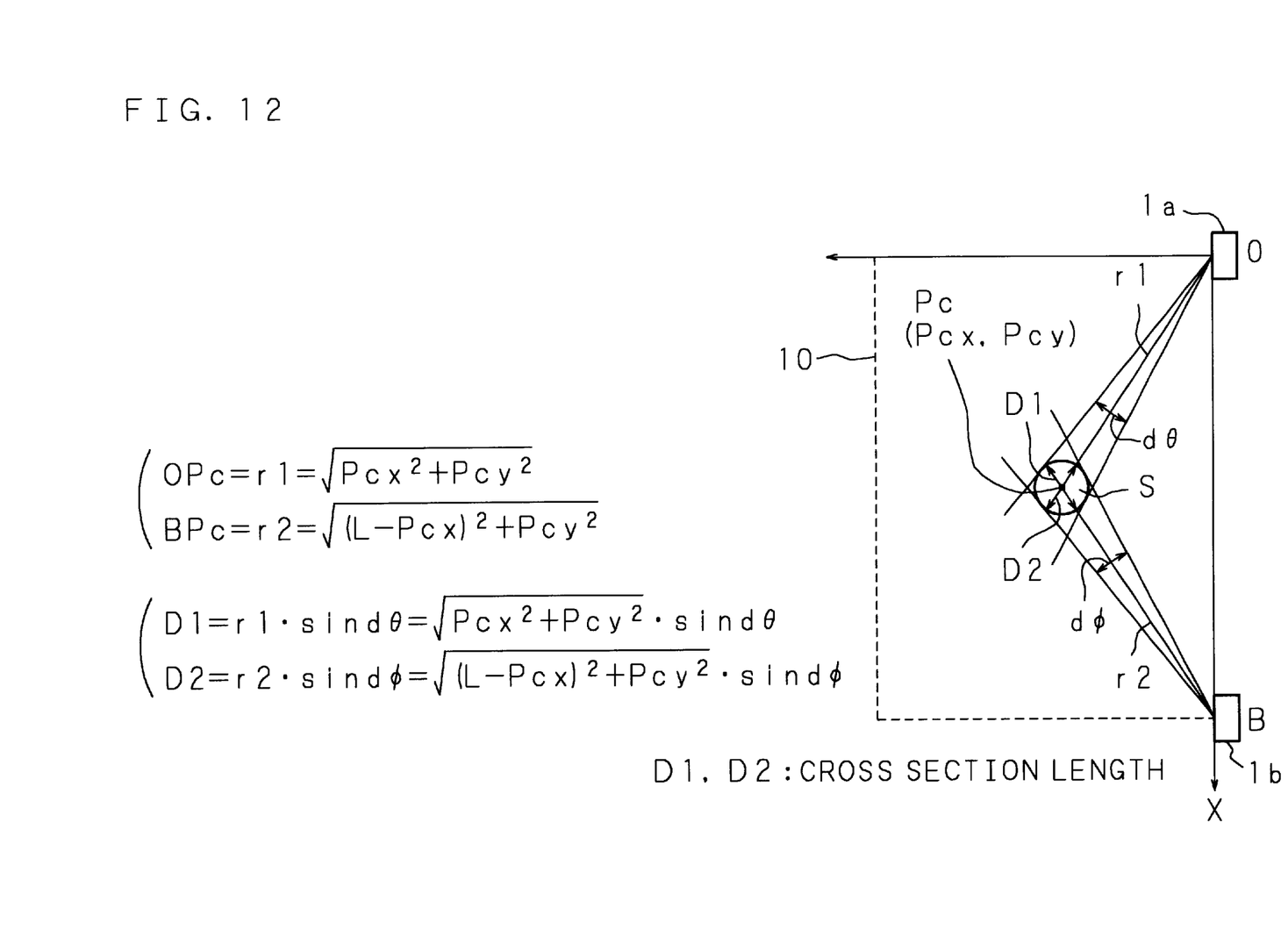
FIG. 12 is a schematic diagram showing the principle of measurement of a cross-section length.

Moreover, in the optical scanning-type touch panel of the present invention, it is possible to calculate the size (the cross section length) of the indicator S (finger) from the measured cut-off region. FIG. 12 is a schematic diagram showing the principle of measuring the cross section length. In FIG. 12, D1 and D2 are the cross section length of the indicator S when seen from the light send/receive units 1a and 1b, respectively. First, distances OPc (r1) and BPc (r2) from the positions O (0, 0) and B (L, 0) of the light send/receive units 1a and 1b to the central point (Pcx, Pcy) of the indicator S are calculated as given by equations (8) and (9) below.

$$OPc=r1=(Pcx^2+Pcy^2)^{1/2} \quad (8)$$

$$BPc=r2=\{(L-Pcx)^2+Pcy^2\}^{1/2} \quad (9)$$

Since the cross section length can be approximated by the product of the distance and sine of the cut-off angle, the cross section lengths D1 and D2 are measurable according to equations (10) and (11) below.

$$D1 = r1\cdot\sin d\theta \quad (10)$$
$$= (Pcx^2+Pcy^2)^{1/2}\cdot\sin d\theta$$

$$D2 = r2\cdot\sin d\phi \quad (11)$$
$$= \{(L-Pcx)^2+Pcy^2\}^{1/2}\cdot\sin d\phi$$

Further, when θ and φ≈0, it is possible to approximate sin dθ≈dθ≈tan dθ and sin dφ≈dφ≈tan dφ, and therefore dθ or tan dθ, or dφ or tan dφ may be substituted for sin dθ and sin dφ in equations (10) and (11).

Industrial Applicapility

As described above, in the optical scanning-type touch panel of the present invention, since the threshold value used as a criterion in judging whether a cut-off region is formed by the indicator is varied according to the scanning angle, it is possible to eliminate the effect of the directly incident light on the light receiving elements and calculate the accurate cut-off region, and thereby providing highly accurate calculation results for the position and size of the indicator.

What is claimed is:

1. An optical scanning-type touch panel comprising:
    a light retro-reflecting member disposed outside a predetermined area;
    at least two light transmitting/receiving sections, each having an optical scanner for angularly scanning light in a plane substantially parallel to the predetermined area and a light receiving element for receiving reflected light from a portion of the light retro-reflecting member, which portion was illuminated with light;
    a measuring section for measuring a scanning light cut-off region formed in the predetermined area by an indicator, based on a scanning angle of said optical scanner and a result of receiving light by said light receiving element;
    a calculating section for calculating a position and size of the indicator according to a result of the measurement performed by said measuring section;
    a start detecting section for detecting a start of optical scanning by comparing the result of receiving light with a first threshold;
    an angle detecting section for detecting an angle of the scanning light after the start of optical scanning; and a memory section for storing a plurality of reference values of different levels, wherein said measuring section measures the scanning light cut-off region after the start of optical scanning by comparing the result of receiving light by said light receiving element with a second threshold different from said first threshold, said second threshold determined by a reference value selected from the plurality of reference values stored in said memory section according to the angle of the scanning light detected by said angle detecting section, said reference value fluctuates according to said detected angle of scanning light.

2. The optical scanning-type touch panel as set forth in claim 1, wherein a large reference value is selected when the angle of the scanning light is small, and a small reference value is selected when the angle of the scanning light is large.

3. The optical scanning-type touch panel as set forth in claim 1, wherein said angle detecting section includes an optical scanning start detector for detecting a start of optical scanning and a timer having the function of measuring time, and detects the angle of the scanning light according to an elapsed time measured by said timer from a time at which the start of optical scanning was detected by said optical scanning start detector.

4. The optical scanning-type touch panel as set forth in claim 2, wherein said angle detecting section includes an optical scanning start detector for detecting a start of optical scanning and a timer having the function of measuring time, and detects the angle of the scanning light according to an elapsed time measured by said timer from a time at which the start of optical scanning is detected by said optical scanning start detector.

5. The optical scanning-type touch panel as set forth in claim 3, wherein said optical scanning start detector detects timing of starting reception of light of not lower than a predetermined level by said light receiving element as the start of optical scanning.

6. The optical scanning-type touch panel as set forth in claim 4, wherein said optical scanning start detector detects timing of starting reception of light of not lower than a predetermined level by said light receiving element as the start of optical scanning.

* * * * *